United States Patent [19]

Dalla Torre et al.

[11] Patent Number: 5,140,065

[45] Date of Patent: Aug. 18, 1992

[54] COLD IMPACT RESISTANT, PIGMENT-COMPATIBLE THERMOPLASTIC MOLDING COMPOSITIONS

[75] Inventors: Hans Dalla Torre; Hans-Jörg Liedloff, both of Domat/Ems; Franz Kerschbaumer, Chur, all of Switzerland

[73] Assignee: EMS-Inventa AG, Domat/Ems, Switzerland

[21] Appl. No.: 500,086

[22] Filed: Mar. 27, 1990

[30] Foreign Application Priority Data

Mar. 30, 1989 [CH] Switzerland ............ 1153/89

[51] Int. Cl.⁵ .................. C08L 77/00; C08L 283/04
[52] U.S. Cl. .......................... 525/66; 525/89; 525/90; 525/167; 525/183; 525/425
[58] Field of Search ............ 525/66, 89, 90, 167, 525/425

[56] References Cited

U.S. PATENT DOCUMENTS

| | | | |
|---|---|---|---|
| 3,639,502 | 2/1972 | Ozaki et al. | 525/425 |
| 3,839,245 | 10/1974 | Schlossman et al. | 525/425 |
| 4,346,024 | 8/1982 | Coquard et al. | 525/425 |
| 4,579,914 | 4/1986 | Nelb, II et al. | 525/425 |

FOREIGN PATENT DOCUMENTS 2592388 7/1987 France .

*Primary Examiner*—Ana L. Carrillo
*Attorney, Agent, or Firm*—Bierman and Muserlian

[57] ABSTRACT

4-component thermoplastic molding compositions which are easily processed on injection molding or extrusion machinery consisting essentially of amorphous copolyamides which can be produced from inexpensive raw materials, inexpensive elastomeric block polyetherpolyamides and block polyetheresterpolyamides as well as commercially available modified copolyolefins and are distinguished by high cold impact resistance, good ductility, variably adjustable rigidity which is independent of the degree of humidity and excellent pigment compatibility as well as by good stress crack resistance, thermal and dimensional stability.

20 Claims, No Drawings

COLD IMPACT RESISTANT, PIGMENT-COMPATIBLE THERMOPLASTIC MOLDING COMPOSITIONS

U.S. Pat. No. 4,410,661 describes polymeric compositions comprising amorphous copolyamides, polyamide 66 and a modified copolyolefin. This type of alloy is impact resistant and particularly rigid but its rigidity is greatly dependent on the moisture content of the material due to the high polyamide 66 content. Further disadvantages of the compositions which affect processing are the high viscosity and the tendency to brittleness at low temperatures. The poor pigment compatibility which leads to textured rough surfaces with marbling effects is particularly disadvantageous.

Notched bar impact resistant compositions are described in U.S. Pat. No. 4,536,541 which relates to impact resistant amorphous copolyamides modified with modified EPDM polymers. These alloys have very high melt viscosities which are difficult to control and due to the low compatibility of their components, they tend to delaminate. Moreover, they are sensitive to stress cracking and produce extremely poor surfaces with dye pigments. Their possible applications are therefore greatly reduced.

In the Swiss Application Ser. No. 655,941 and in the nearly identical EP-A0 233,428, flexible polyamide blends are described which consist of semi-crystalline polyamide types, preferably polyamide 12, besides polyamide elastomers and olefinic elastomers. Consequently, they contain amorphous polyamides as co-components because their high rigidity is opposed to the task of flexible compounds. Such polymer alloys are according to their function elastic materials, which distinguish themselves by low values of modulus of elasticity with additional improved cold impact resistance, which both however are strongly impaired by moisture uptake. The blends show a good processability but they are expensive and can't be used for applications where high rigidity is indispensable.

The blends of polyamide elastomers described in Japanese patent Applications Ser. No. 61-025,114 and No. 59-188,603, where also amorphous copolyamides are used, yield molding materials with especially low flow temperatures for high extrusion speeds in the production of highly flexible coatings for optical fibers. These products are unsuitable for applications needing higher rigidities such as structural members. Because the ratio of the monomer of polyamide 12 is very high, the costs of the raw materials for these alloys are also high. Therefore, they are largely excluded from applications where the material costs are important such as covering parts of car bodies.

In U.S. Pat. No. 4,486,507, multi-layered transparent films having a uniform stretching and shrinking capacity can be produced as packaging materials for foods. However, the polyolefins used, partially crystalline linear copolyamides, partially aromatic copolyamides, amorphous copolyamides and elastomeric copolyamides, do not exist as a blend or alloy but as layers. Polyamide 6 or 66 forms the main content of the copolyamides and this ensures, on the one hand, good transparency, but makes the mechanical properties such as rigidity and strength markedly dependent on the moisture content, i.e. of the degree of conditioning.

OBJECTS OF THE INVENTION

It is an object of the invention to provide molding compositions of polyamide mixtures having rigidity which is indepent of the degree of conditioning and is adjustable over wider ranges than hitherto possible, wherein moldings produced therefrom on the one hand are perfectly compatible both with inorganic dye pigments and with inorganic fillers and produce smooth, uniform, streak-free surfaces and, on the other hand, are resistant to stress cracks under the influence of frequently used solvents such as ketones, aromatic hydrocarbons, halogenated hydrocarbons, alcohols and benzene, and wherein the polyamide products obtained have high impact resistance at room temperature, good impact resistance behavior at lower temperatures and ductility, i.e. do not break in a brittle manner, and the molding compositions have high stability of shape under heat and good dimensional stability and can easily be processed on extrusion and injection molding machinery, allowing moldings necessitating prolonged flow paths during production to be produced.

This and other objects and advantages of the invention will become obvious from the following detailed description.

THE INVENTION

The novel molding compositions of the invention are 4-component cold impact-resistant, pigment-compatible thermoplastic molding compositions of adjustable rigidity independent of the degree of conditioning comprising A) 1 to 95% by weight of at least one block polyetherpolyamide, B) 1 to 95% by weight of at least one block polyetheresterpolyamide, C) 95 to 5% by weight of at least one heat dimensionally stable amorphous copolyamide base on aromatic dicarboxylic acids and hexamethylenediamine, D) 0.1 to 70% by weight of at least one modified copolyolefin and optionally at least one member of the group consisting of additives, fillers, polyamides and other polymers, the total of all constituents being 100% by weight, components A) and B) being made of monomers of polyamide 6 or 66.

It has surprisingly been found that the required combination of properties can be achieved with blends of the following 4-polymer types:

A. 1 to 95% by weight of polyamide elastomers from the series including block polyetherpolyamides which are polycondensed from polyetherdiamines, dicarboxylic acids, dimeric acids and from lactams, preferably caprolactam which are described in detail in DE-OS 3,006,961 and Swiss application Ser. No. 655,941.

B. 1 to 95% by weight of block polyetheresterpolyamides which are polycondensed from polyetherdiols, dicarboxylic acids, dimeric acids and lactams, preferably caprolactam which are also described in detail in DE-OS 3,006,961. It is advantageous for achieving reproducible, relatively high rigidity if the sum of block polyetherpolyamides A and block polyetheresterpolyamides B is at most 40% by weight, particularly at most 30% by weight and most preferably at most 20% by weight of the molding compositions, For molding compositions which are more flexible and less rigid, components A and B together amount to up to 90% by weight, particularly at least 50% by weight.

C. 95 to 5% by weight of amorphous copolyamides having high stability of shape under heat which are polycondensates, on the one hand, from 2 to 30 mol-% of cycloaliphatic diamines of 7 to 22 carbon atoms and at least one cyclohexane ring such as 4,4'-diaminodicyclohexylmethane, alkyl-substituted derivatives of 4,4'-diaminodicyclohexylmethane, particularly 3,3'-dimethyl-4,4'-diaminodicyclohexylmethane, 3-aminomethyl-3,5,5'-trimethylcyclohexylamine, 1,4-diaminomethylcyclohexane, 1,3-diaminomethylcyclohexane or cycloaliphatic diamines with several condensed rings and/or hexamethylenediamine as main component which can be replaced by 20 to 40 mol-% of straight or branched chain diamines of 7 to 12 carbon atoms, particularly by alkyl-substituted hexamethylenediamines and, on the other hand, from aromatic or alkyl-substituted aromatic dicarboxylic acids, particularly isophthalic acid which can be replaced by 15 to 30 mol-% of terephthalic acid or tert.-butylisophthalic acid or by a maximum of 20 mol-% of an aliphatic dicarboxylic acid of 6 to 12 carbon atoms, particularly adipic or sebacic acid, while further monomers which form semi-crystalline polyamides such as lactams or ω-aminocarboxylic acids of 6 to 12 carbon atoms or aliphatic diamines of 4 to 13 carbon atoms and aliphatic dicarboxylic acids of 4 to 14 carbon atoms in quantities of up to 60% by weight of all the monomers can be present. It is advantageous if these amorphous copolyamides have a glass transition point of least 100° C., particularly of 120° to 185° C.

D. Modified copolymers which are preferably grafted with unsaturated dicarboxylic acids such as maleic acid or derivatives thereof such as ethylenepropylene, frequently called EPM, or ethylenepropylenediene, frequently called EPDM (NL-PS 8,302,602) or copolymers with unsaturated functional comonomers such as acrylic acid and homologues and/or derivatives thereof such as those from ethylene and methacrylic acid compounds, olefin copolymers such as acrylonitrile-butadiene-styrene, frequently called ABS (U.S. Pat. Nos. 3,134,746; 3,267,175; 3,218,371; and 4,381,371), methylmethacrylate-butadiene-styrene, frequently called MBS (U.S. Pat. Nos. 3,668,274; 3,796,771; and 3,984,497), acrylonitrile-butadiene (DE-OS 2,734,693), styrene-ethylene-butadiene-styrene, frequently called SEBS, styrene-ethylene-propylene called SEP, styrene-ethylene-butadiene called SEB, and isopreneacrylonitrile (EP No. 131,113) frequently called nitrile rubber.

The presence of the block polyetherpolyamides (A) or of the block polyetheresterpolyamides (B) not only additionally increases the level of impact resistance but also substantially improves the compatibility of the other components and the stress cracking behavior so that stress cracks and delamination are avoided under load. The presence of the modified copolyolefins additionally increases the level of impact resistance and ductility in a synergistic manner.

The proportion of modified copolyolefins is from 0.1 to 70, preferably 5 to 40% by weight, most preferably 8 to 20% by weight of all the molding compositions and is highly dependent on the type of copolyolefin as, for example, styrene-containing copolyolefins increase the modulus of elasticity while, for example, ethylene-propylene-containing copolymers reduce the modulus of elasticity and simultaneously improve the notched bar impact resistance.

An essential advantage of the blends of the invention is their rigidity which is insensitive to the moisture content of the molding compositions and which is particularly not negatively influenced. It has surprisingly turned out that the remaining moisture uptake of the components particularly has no lowering effect on the modulus of elasticity, that is on the rigidity, even when the 4-component-blend contains low amounts of amorphous copolyamide. As the table infra shows, even some higher values of the modulus of elasticity are measured for conditioned moldings of the invention, whereas according to the prior art moisture, acting as a plasticizer, lowers the modulus of elasticity clearly.

The invention also relates to a process for producing the molding compositions of the invention, during whose implementation all components are mixed together with the additives and fillers and are processed in one or more extruder passages. However, it is also possible to admix individual or several components or parts thereof with the other components or fractions thereof which have already been mixed in the molten state. This can be carried out, for example, at separate inlet openings of an extruder. In a preferred embodiment of the process, one or both of components A and/or B are incorporated individually or together as a blend with parts or all of component D into the melt of the remaining components.

An advantage of the invention is that the rigidity, i.e. the modulus of elasticity, of the molding compositions of the invention can be adjusted intentionally and reproducibly by varying the proportions by weight of components A and B relative to component C. Thus, for a tensile modulus of elasticity range according to DIN 53457 of 800 to 2400 N/mm$^2$, 30 to 80% by weight of amorphous copolyamides C and 15 to 55% by weight of polyamide elastomers A and B are advantageously used, while for flexible molding compositions, up to 80% by weight of polyamide elastomers A and B are required for a tensile modulus of elasticity range of 800 to 300 N/mm$^2$.

The polyamide alloys of the invention can also contain further components such as fillers, reinforcing agents, pigments, dyes, lubricants, stabilizers, nuclei forming agents or other additives. The proportion in each of the components is up to 30% by weight, preferably 5 to 10% by weight of the compositions. Moreover, they can also be alloyed or mixed with other polyamide types or extraneous polymers.

The claimed molding compositions can be processed particularly readily on suitable processing machinery to form large-area moldings, for example for the production of vehicle body parts, and also for the production of parts of apparatus of the type used in machine tools and sports equipment.

In the following examples there are described several preferred embodiments of the invention to illustrate the same. However, it should be understood that the invention is not intended to be limited to the specific embodiments.

EXAMPLE 1

A mixture of 50% by weight of an amorphous copolyamide of the XE 3038 type (Ems Chemie AG, Switzerland) with a relative viscosity of 1.44 (0.5% m cresol) and a $T_g$ of 140° C., 35% by weight of a block polyetherpolyamide produced from caprolactam, the dimeric acid Pripol 1013 and the polyetherdiamine Jeffamin D-2000, 5% by weight of a block polyetheresterpolyamide produced from a Terathane 1000 type of polyetherdiol, the dimeric acid Pripol 1013 and caprolactam, and 10% by weight of a EPM copolyolefin of the Exxelor VA 1801 type (Exxon Chemicals) of ethylene and propylene modified with maleic acid anhydride, and additionally 3% of dye pigment were thoroughly mixed and extruded through a ZSK 30 type WPF extruder to obtain a molding composition from which test samples were produced.

EXAMPLE 2

40% by weight of an amorphous copolyamide, 10% by weight of a block polyetherpolyamide and 3% by weight of dye pigment as mentioned in Example 1 and 50% by weight of a block polyetheresterpolyamide as mentioned in Example 1, which had been alloyed with 20% by weight of the copolyolefin in Example 1 were compounded by extrusion and processed into injection molded test samples.

EXAMPLE 3 black pigment were compounded and injection molded to form test samples.

EXAMPLE 5

55% by weight of an amorphous copolyamide of the XE 3238 type (Ems Chemie AG, Switzerland) with a relative viscosity of 1.40 (0.5% m cresol) and a $T_g$ of 175° C., 20% by weight of a block polyetherpolyamide of Example 1 and 10% by weight of a block polyetheresterpolyamide of Example 1 and 15% by weight of a copolyolefin of (EPM) type and dye pigment of Example 1 were compounded and test samples were produced from the melt.

The results of Examples of 1 to 5 are reported in the following Table.

|  |  |  | Example No. | | | | |
|---|---|---|---|---|---|---|---|
|  |  |  | 1 | 2 | 3 | 4 | 5 |
| Composition rate | A+B/C/D | % b.w. | 35+5/50/10 | 10+40/40/10 | 18+2/60/20 | 30+40/20/10 | 20+10/55/15 |
| Melt viscosity | 270° 122,6 N | Pa · s | 330 | 230 | 372 | 116 | 392 |
| Glass trasition point $T_g$ | DSC | °C. | 133 | 128 | 138 | 88 | 160 |
| Surface | visual |  | smooth streak-free | smooth streak-free | uniformly smooth | smooth streak-free | uniformly smooth |
| Stress crack resistance in Methanol and Chloroform | visual |  | very good | no cracks | no cracks | no cracks | no cracks |
| Impact resistance 23°/dry | DIN 53453 |  | n.b. (no break) | n.b. | n.b. | n.b. | n.b. |
| Notched impact resistance 23°/dry | DIN 53453 | kJ/m$^2$ | 33 | 33 | 43 | n.b. | 30 |
| Notched impact resistance −40°/dry | DIN 53453 | kJ/m$^2$ | 10 | 9,5 | >10,4 | 40 | 12,5 |
| Tensile strength at Yield 23°/dry | DIN 53455 | N/mm$^2$ | 48 | 37 | 52 | — | 47 |
| Tensile strength at break 23°/dry | DIN 53455 | N/mm$^2$ | 39 | 43 | 43 | 28 | 43 |
| Elongation at break 23°/dry | DIN 53455 | % | 75 | 200 | 45 | 284 | 48 |
| Tensile modulus of elasticity 23°/dry | DIN 53457 | N/mm$^2$ | 1580 | 1285 | 1680 | 240 | 1660 |
| Tensile modulus of elasticity 23°/conditioned | DIN 53457 | N/mm$^2$ | 1550 | 1210 | 1720 | 300 | 1720 |
| Penetration test | DIN 53443 |  |  |  |  |  |  |
| Penetration work at −20° |  | Nm | 59 | 56,2 | 62,5 | 59,9 | 51 |
| Ductility at −20° | visual | % | 100 | 100 | 100 | 100 | 100 |
| Shrinkage of DIN test bar (150 × 20 × 4 mm) after tempering in oven for 3 hours at 140° C. |  | °/$_{oo}$ | −5 | −6 | −4 | — | −4,5 |

60% by weight of an amorphous copolyamide of Example 1 were compounded with 18% by weight of a block polyetherpolyamide and 2% by weight of a block polyetheresterpolyamide of Example 1 and 20% by weight of a copolyolefin of the SEBS type (trade name Kraton G 1901 X, Shell Chemical Company) grafted with maleic acid anhydride and additionally 4% of TiO$_2$ pigment and were injection molded to form test samples.

EXAMPLE 4

20% by weight of an amorphous copolyamide of the Gilamid type G 21 (Ems Chemie AG, Switzerland) with a relative viscosity of 1.52 (0.5% m cresol) and a $T_g$ of 122° C., 40% by weight of a block polyetherester-polyamide of Example 1 and 30% by weight of a block polyetherpolyamide of Example 1, 10% by weight of a copolyolefin of the Exxelor VA 1801 type (Exxon Chemicals) and additionally 1% by weight of carbon

EXAMPLE 6

The components of Example 1 were each compounded together with 20% by weight of talcum or with 20% by weight of glass rovings and were extruded using an extruder of the WPF 30 type at mass temperatures of 280° C. to 300° C. The very rigid test samples produced therefrom had a smooth, uniform surface.

Various modifications of the molding compositions may be made without departing from the spirit or scope thereof and it is to be understood that the invention is intended to be limited only as defined in the appended claims.

What is claimed is:

1. A cold impact-resistant, pigment-compatible thermoplastic molding composition of adjustable rigidity independent of the degree of conditioning comprising A) 1 to 95% by weight of at least one block polyetherpolyamide,
B) 1 to 95% by weight of at least one block polyetheresterpolyamide,
C) 95 to 5% by weight of at least one heat dimensionally stable amorphous copolyamide based on aromatic dicarboxylic acids and hexamethylenediamine,
D) 0.1 to 70% by weight of at least one copolyolefin grafted with an unsaturated dicarboxylic acid and
E) optionally up to 30% by weight of at least one member of the group consisting of fillers, reinforcing agents, pigments, dyes, lubricants, stabilizers and nuclei forming agents, the total of all constituents being 100% by weight, components A) and B) being made of monomers of polyamide 6 or 66.

2. A molding composition of claim 1 wherein the sum of A) and B) is 90% by weight of the composition.

3. A molding composition of claim 1 wherein the sum of A) and B) is up to at least 50% by weight of the composition.

4. A molding composition of claim 1 wherein the sum of A) and B) is 10 to 40% by weight of the composition.

5. A molding composition of claim 1 wherein the sum of A) and B) is at most 30% by weight of the composition.

6. A molding composition of claim 1 wherein the sum of A) and B) is at most 20% by weight of the molding composition.

7. A molding composition of claim 1 wherein the amorphous copolyamide C) contains isophthalic acid and other aromatic dicarboxylic acids or aliphatic dicarboxylic acids.

8. A molding composition of claim 7 wherein 20 to 40 mole % of hexamethylenediamine is replaced by at least one member of the group consisting of another aliphatic diamine and cycloaliphatic diamine.

9. A molding composition of claim 8 wherein the cycloaliphatic diamine has 7 to 22 carbon atoms and at least one cyclohexane ring and the aliphatic diamines are straight or branched chain of 7 to 12 carbon atoms.

10. A molding composition of claim 9 wherein the cycloaliphatic diamine is at least one member selected from the group consisting of 4,4'-diaminodicyclohexylmethane, 3,3'-dimethyl-4,4'-diaminodicyclohexylmethane, 3-aminomethyl-3,5,5'-trimethylcyclohexylamine, 1,4-diaminomethylcyclohexane and 1,3-diaminomethylcyclohexane.

11. A molding composition of claim 7 wherein the copolyamide C) contains up to 30 mole % of terephthalic acid.

12. A molding composition of claim 11 containing up to 20 mole % of at least one aliphatic dicarboxylic acid in component C).

13. A molding composition of claim 12 wherein the aliphatic dicarboxylic acids have 6 to 12 carbon atoms.

14. A molding composition of claim 7 wherein the amorphous copolyamide C) contains up to 60% by weight of monomers which form semi-crystalline polyamides.

15. A molding composition of claim 14 wherein the semi-crystalline polyamide is an amide from lactams or $\omega$-amino carboxylic acids of 6 to 12 carbon atoms or from diamines of 4 to 13 carbon atoms and aliphatic dicarboxylic acids of 4 to 14 carbon atoms.

16. A molding composition of claim 1 wherein the amount of component D) is 5 to 40% by weight.

17. A molding composition of claim 1 wherein component B) contains blocks of dicarboxylic acids of 6 to 13 carbon atoms and polyetherdiols, blocks of PA6, PA66 or mixtures thereof.

18. A molding composition of claim 17 wherein the dicarboxylic acids are at least one member of the group consisting of aliphatic dicarboxylic acids of 6 to 13 carbon atoms, dimerized fatty acids of up to 36 carbon atoms and aromatic diarboxylic acids of 8 to 12 carbon atoms.

19. A molding composition of claim 17 wherein the polyether diols have the formula HO[—Alk$_1$]$_y$—O—Alk$_2$—OH wherein y is 1 to 20 and Alk$_1$ and Alk$_2$ are branched or unbranched alkylene of 1 to 4 carbon atoms.

20. A molded article produced by extension or injection molding of a composition of claim 1.

* * * * *